United States Patent

Ewald

[15] 3,707,112

[45] Dec. 26, 1972

[54] TELESCOPING PISTON MEANS FOR HYDRAULIC BRAKE BOOSTER

[72] Inventor: Jerome T. Ewald, South Bend, Ind.

[73] Assignee: The Bendix Corporation

[22] Filed: Jan. 28, 1971

[21] Appl. No.: 110,568

[52] U.S. Cl. .......................... 91/376, 91/28, 92/129
[51] Int. Cl. .......................... F15b 9/10, F15b 13/04
[58] Field of Search .......... 92/255, 172, 138, 129, 63, 92/422; 91/28, 434, 376, 378, 328

[56] References Cited

UNITED STATES PATENTS

| 2,908,137 | 10/1959 | Spalding et al. | 91/28 |
| 2,945,352 | 7/1960 | Stelzer | 91/28 |
| 3,101,742 | 8/1963 | Kellogg | 91/434 |
| 3,312,148 | 4/1967 | Adams | 92/138 |

Primary Examiner—Paul E. Maslousky
Attorney—Ken C. Decker and Plante, Hartz, Smith & Thompson

[57] ABSTRACT

A vehicle fluid actuated brake booster device having a housing with a bore formed therein to reciprocally receive piston means, the movement of which is controlled by operator-operated valve means. The brake booster piston means is connected through a force transmitting rod to the piston of a conventional brake master cylinder assembly for applying the vehicle brakes. The brake booster piston is telescopically received in a sleeve, the latter of which is slidably arranged in the bore for movement together with said booster piston and relative thereto within said bore. The sleeve and piston are formed with circumferential, axially extending grooves or recesses which are in selective fluid communication with their associated inlet, outlet and working ports as determined by manipulation of said valve means.

5 Claims, 2 Drawing Figures

PATENTED DEC 26 1972 3,707,112

INVENTOR
JEROME T. EWALD
BY Ken C. Decker
ATTORNEY

TELESCOPING PISTON MEANS FOR HYDRAULIC BRAKE BOOSTER

BACKGROUND OF THE INVENTION

The invention concerns a vehicle fluid pressure actuated brake booster having valve means located within the piston for converting a manual input force into an amplified output force and more particularly to such a booster which is mechanically connected to a conventional master cylinder piston.

In such boosters as aforementioned, the stroke of the booster piston must be at least as long as the length of the stroke of the master cylinder piston with which it is interconnected through a force transmitting rod. Obtaining the necessary booster piston stroke does not pose a problem except in those instances where the bore, in which the booster piston slides, communicates with a multiplicity of ports, at least three, disposed axially along the bore. With the ports so disposed axially, it has been the practice in the past to provide the piston with a circumferential recess or groove for each of the ports, the axial length of the recess is determined by the stroke required of the piston. Since each of the inlet, outlet and working ports must maintain registry with its associated recess continuously during piston movement, it is apparent that the piston must have an overall greater length for a three port connection than for two ports, for example. Obviously, greater piston length necessitates a longer housing for the piston, in order to accommodate the piston stroke. In view of the already crowded condition under the hood of today's vehicle, lengthening the housing is impractical. The herein described invention proposes to solve this problem by telescoping the booster piston in a sleeve which is also slidably positioned in the bore. Both piston and sleeve are formed with circumferential recesses appropriately interconnected by fluid passages.

SUMMARY OF THE INVENTION

In view of the foregoing, an important object of the invention is to provide a brake booster mechanism with piston means telescopically arranged in the bore to obtain maximum stroke for a given bore length.

Another object of the invention is to provide a brake booster mechanism having its bore connectible to a multiplicity of ports axially disposed in said bore, and further having piston means formed from two telescoping members, each of which is circumferentially recessed for communication with said ports as determined by manipulation of valve means.

A still further object of the invention is to provide a brake booster equipped with piston means comprising two members, one slidable within the other, and being movable one with respect to the other for a predetermined length of their total stroke and movable conjointly thereafter.

The above and other objects and features of the invention will become apparent from the following description taken in connection with the accompanying drawing.

DETAIL DESCRIPTION

Figures 1, 2:
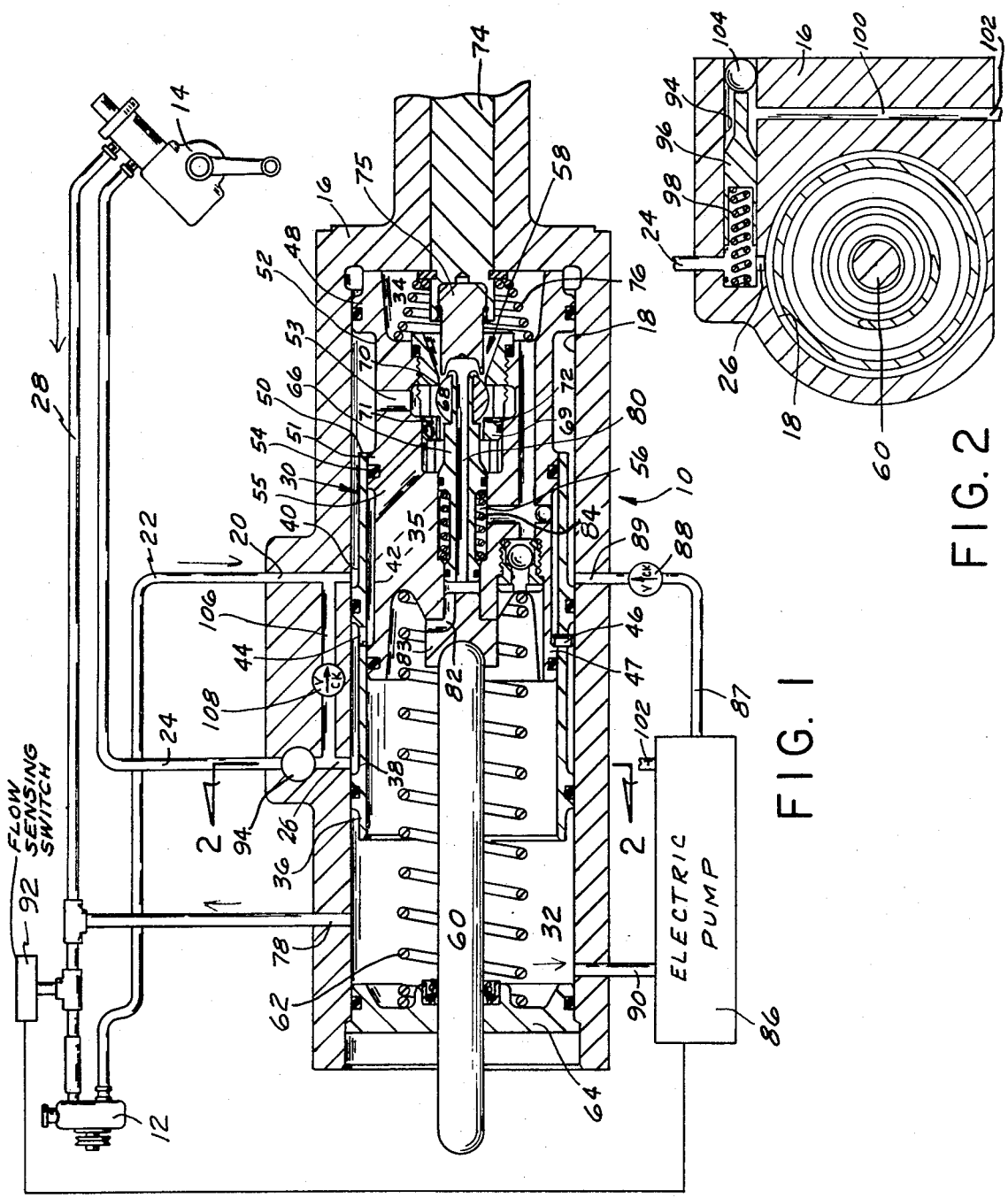
FIG. 1 is a view, partially in section, of a hydraulic boost mechanism constructed in accordance with the invention which is disclosed in association with other elements of the vehicle hydraulic system illustrated schematically.
FIG. 2 is a cross-sectional view of the boost mechanism taken along the line 2—2 of FIG. 1.

Referring now to FIG. 1, the reference numeral 10 designates a hydraulic boost mechanism located in a vehicle hydraulic system comprising an engine driven pump 12 and a steering gear 14 operatively connected to the vehicle wheels in a manner well known to those skilled in the art. The boost mechanism 10, which may be termed more specifically a hydraulic brake booster, includes a housing 16 provided with a bore 18. The brake booster housing 16 is equipped with an inlet port 20 which is in fluid communication with a main hydraulic source of fluid from the pump 12 through conduit 22. A conduit 24 connects working port 26 in the housing 16 to the device 14, which in this particular system is a steering gear. A return line 28 carries the return fluid from the gear 14 to the pump 12 for recirculation.

Piston means 30 is reciprocally located in the bore 18 of the housing 16, dividing said bore into two chambers 32 and 34 at the respective ends of said piston means. The piston means includes a piston 35 and a sleeve 36, the latter of which is formed with circumferential grooves or recesses 38 and 40 which maintain registry with the working port 26 and inlet port 20, respectively, during movement of the piston means in said bore. The piston is also formed with a circumferential groove or recess 42 communicating with groove 38 at all times through passage 44 in the sleeve 36. A pin 46, located in the sleeve, projects into the groove 42 for engagement with the land 47 to restrict the longitudinal separation between the sleeve and piston. Telescoping of the piston 35 within the sleeve 36 is controlled by engagement between land 48 of the piston and end 50 of the sleeve. It is noted that groove 42 maintains communication with passage 44 during the telescoping action between the piston and the sleeve. The piston 35 is further formed with a circumferential groove 52 between the lands 48 and 51, the latter of which is provided with a seal 54 which prevents leakage between the grooves 42 and 52. As is commonly known to those skilled in the art, the other lands formed on the sleeve and piston are likewise equipped with the necessary seals. This telescoping arrangement of the piston 35 within the sleeve 36 offers greater design flexibility in brake boosters in which the bore 18 communicates with a multiplicity of axially disposed ports, as herein shown, comprising an inlet port 20, an outlet port 78, and a working port 26. Referencing FIG. 1, it can be seen that for a given piston stroke requirement, the telescoping concept, herein described in detail, permits the use of a piston having an overall length which is less than would be needed to accommodate the piston to the axially disposed ports of the conventional brake booster, in which the piston per se is formed with a circumferential recess for each port. Obviously, reducing the piston length allows for the use of a housing having a reduced overall length. By employing the telescoping piston and sleeve assembly, the piston length can be kept relatively short, even though its stroke is not influenced, since the sleeve which includes axial recesses 38 and 40 in registry with ports 26 and 20, respectively, remains stationary upon the initial application of fluid pressure to the chamber 34, i.e., the piston 35 slides within the sleeve 36 until the land 48 abuts the end 50 of the sleeve. Upon engagement of the end 50 by the land 48, the piston means 30 moves as a unit to the left, as viewed in FIG. 1.

Located within a central cavity or recess 56 of the piston 35 is valve means 58 for controlling reciprocation of said piston 35 in actuating a brake master cylinder, not shown, through a force transmitting rod 60, in a manner well known to those skilled in the art. A spring 62 is interposed between an end closure 64 and one end of the piston 35 to normally urge the piston to the right end of the bore, as viewed in the drawing.

The valve means 58 is of the so-called open-center type which allows the pump 12 to freely circulate fluid through the brake booster 10 to the steering gear in the absence of vehicle braking. In this position fluid flows from the inlet port 20 to the working port 26 by way of recesses 40 and 52, radial passage 53, between seat 72 and the valve element 68, passage 55, recess 42, passage 44 and recess 38. The valve means comprises a tubular valve member 66 on one end of which is carried a spherical element 68 for engagement with valve seats 70 and 72, respectively, depending on whether the brake booster is unapplied (as shown) or applied. In the latter case the valve member is unseated from seat 70 and seated on seat 72. Valve seat 72 is formed on a ring element 69 having axial passages 71 to maintain fluid flow to said steering gear 14 during brake boost actuation when the valve element 68 bears against the seat 72. These passages 71 act as a by-pass for valve member 66 when seated on seat 72 to insure an adequate supply of fluid to the device 14. In the brake booster applying position, the operator pushes on thrust member 74 urging it together with valve member 75 into seating relationship with valve element 68. Further movement of the thrust member unseats the element 68 to communicate the chamber 34 with the inlet 20. Fluid from the inlet port enters the passage 53 and passes between the seat 70 and valve element 68 of valve member 66, into chamber 34 where the fluid acts on the right end of the piston 35 urging it leftward, as viewed in the drawing. Upon removal of the force applied to thrust member 74, a spring 76 lifts the valve member 75 off valve member 68, thereby communicating the chamber 34 with exhaust port 78, which connects the chamber 32 with the engine pump 12 inlet. Communication between the chambers 32 and 34 is through a passage 80 of the tubular valve member 66 and passage 82 in the central boss 83 of the piston 35. A spring 84 is located in the central cavity 56 of the piston for urging the valve member 66 to the right, as viewed in FIG. 1, to cause the valve element 68 to rest against seat 70, cutting off communication between the chamber 34 and the inlet port 20.

Under normal conditions of operation, the engine driven pump 12, considered to be the main source of fluid, supplies sufficient fluid under pressure to successfully operate the power brake boost and the steering gear 14, independently or concurrently. However, should the pump 12 malfunction or should the pump fail to furnish an adequate supply of fluid to the vehicle hydraulic system at a time when needed, an extremely dangerous situation would prevail. Either the brake booster 10 or the device 14, or both, could be rendered inoperable hydraulically. Of course, both could be operated manually, (but this is sometimes difficult for a woman). To minimize the likelihood of losing power for operating the brake booster 10, a second or subsidiary hydraulic source is made available when the fluid from the first or main source reaches a predetermined minimum flow.

The subsidiary hydraulic source is obtained from an electric pump 86 having its outlet connected through a line 87 and check valve 88 with inlet port 89 in the housing 16. The inlet port 89 communicates with the bore 18 and recesses 40 and 52, respectively, of the sleeve 36 and piston 35. A conduit 90 communicates the inlet side of the pump 86 with the chamber 32 of the boost mechanism 10. Since the pump 86, or subsidiary source, is to be effectuated or brought into operation only if the main source falls to some low flow value, a flow sensitive switching device 92 is located in the line 28 to sense such low flow and actuate the electric pump 86. Since the electric pump 86 functions only in emergencies as a subsidiary or auxiliary to the engine driven pump 12 to furnish fluid only to the brake booster, the pump capacity of pump 86 is small compared to pump 12 and is not such that it can supply fluid to the steering gear too.

With reference to FIG. 2, it will be observed that the housing 16 is provided with a drilled passage 94, intersecting the working port 26. A plunger 96, responsive to effectuation of said second source, is slidably received in said passage 94 to interrupt communication between said device and the bore 18. A spring 98 urges the plunger to the right, as viewed in FIG. 2, to permit free flow of fluid from the bore 18 to the device 14 as long as the first or main hydraulic source is maintaining the fluid requirements of the system. A passageway 100 in the housing communicates the back side of a shut-off valve or plunger 96 with the outlet of the electric pump 86 through pipe 102. A spherical plug 104 closes the end of the drilled passage 94. As shown in FIG. 1, fluid shunt connection 106 and a check valve 108 provide communication between the working port 26 and the cavity in the bore adjacent recesses 40 and 52 to allow for circulation of fluid in an otherwise closed fluid circuit due to the action of the shut-off valve 96 cutting out device 14. The check valve 108 acts to equalize the pressures between the cavities formed by the recesses 38 and 40 and the bore 18. The electric pump 86 is provided with its own internal by-pass device, not shown, from the outlet to the inlet to permit recirculation of the fluid should the pressure head at the outlet of the pump 86 reach a predetermined high value.

MODE OF OPERATION

Assuming that the pump 12 is operating properly, i.e., the main source of fluid is adequate, fluid circulates freely through the inlet port 20, recesses 40 and 52, passage 53, the opening between valve seat 72 and ball member 68, passage 55, recess 42, passage 44, recess 38, working port 26, steering gear 14, and back to pump 12. Operation of the brake booster 10 at this time seats the valve member 75 on the ball valve 68, to first cut off the chamber 34 from exhaust port 78, via the tubular member 66. Continued movement of the members 74 and 75 unseats the ball 68 from the seat 70, thus connecting the chamber 34 to the main fluid pressure source in communication with the inlet port 20. Further movement of the members 74 and 75 seats the ball 68 on seat 72. At this moment the chamber 34 is exposed to the full main pressure source, except that which is by-passed through the axial passages 71 to provide fluid for operation of the gear 14. This moves the piston 35 to the left to thereby act on the force transmitting rod 60 to activate a brake master cylinder in a well known manner. Release of applying force from the thrust member 74 returns the piston means 30 and valve means 58 to the present positions, as shown.

In the event that there is an insufficient supply of fluid from the main source, at a time when the brake booster is being operated, this deficiency will be sensed by the flow sensitive device 92 which actuates the electrical pump 86. This effectuates a subsidiary source of fluid which is ample for operating the brake booster alone. The pump 86, which is connected to the inlet port 89 of the booster, communicates with recesses 40 and 52, passage 53, the opening between valve seat 72 and ball member 68, passage 55, recess 42, passage 44, recess 38 and working port 26. These are the same recesses and passages with which the main fluid source communicates. However, the subsidiary source from the pump 86 also acts through conduit 102 and passage 100 on the valve member 96 to shut off communication between the working port 26 and the rest of the vehicle hydraulic system, including the steering gear 14. This means that a much lower capacity pump can be used for the subsidiary source since only the brake booster is controlled by the second source, with the steering gear out of the hydraulic circuit. When operating under the second or subsidiary source of fluid, circulation within the piston means and valve means occurs through the shunt path 106 which connects the recesses 38 and 40 of the sleeve 36. Manipulation of the brake booster is the same irrespective of which of the sources is used.

Whether the main or subsidiary source of fluid is producing movement of the piston means 30, comprising piston 35 and sleeve 36, it is to be noted that upon the application of fluid under pressure to the chamber 34, due to operation of the valve means 58, the piston 35 advances to the left, as viewed in FIG. 1, into the sleeve 36 until the land 48 contacts the end 50 of the sleeve. At this time, however, communication is still maintained with the ports 20 and 26 via recesses 40, 52, passages 53, 71 and 55 and recesses 42 and 38. Observe that recess 42 of the piston 35 has shifted to the left but still communicates with the recess 38 via the passage 44. With the piston shifted to the left, as aforesaid, continued application of fluid pressure to chamber 34 imparts movement conjointly to both piston and sleeve. As noted in the drawing FIG. 1, as the sleeve together with the piston shifts to the left, the recesses 38 and 40 maintain registry respectively with the ports 26 and 20 to insure flow from the main fluid source to the steering gear 14.

I claim:

1. In a hydraulic boost mechanism:
a housing defining a bore therewithin;
piston means slidably mounted in said bore, said piston means defining first and second chambers between opposite ends of said piston means and corresponding ends of said housing;
an inlet port, a working port, and an exhaust port in communication with said bore;
said piston means including inner and outer coaxial, relatively movable members, said outer member having a recess communicating with one of said ports, said inner member having a recess communicating with the recess in the outer member, whereby said recess in the inner member is continuously communicated to said one port during the entire range of relative sliding movement between said members;
passage means extending through said inner member to communicate said recess in the latter with another of said ports; and
operator-actuated valve means within said passage means for controlling fluid communication between said ports and said chambers, said valve means including a valve operating member slidable relative to said piston means;
said inner member sliding relative to said outer member after movement of said valve operating member to open said valve means to communicate fluid into one of said chambers to shift said piston means.

2. The invention of claim 1; and
abutment means carried by said inner and outer members, said inner member being movable relative to said outer member until the abutment means carried by one of said members engages the abutment means carried by the other of said members whereupon said members are movable conjointly.

3. The invention of claim 1; and
resilient means operatively connected to said inner and outer members for urging said members toward one end of the bore.

4. The invention of claim 3; and
a pin carried by one of said members slidably engaging a groove in the other of said members;
said resilient means urging said inner member relative to said outer member until the pin engages the end of the groove, whereupon said members are urged as a unit toward said one end of the bore.

5. The invention of claim 1:
said outer member being a sleeve slidably receiving said inner member, said recess in said outer member being defined between the outer circumferential surface of the sleeve and the wall of said bore, the recess in said inner member being defined between the outer circumferential surface of said inner member and the inner circumferential surface of said sleeve; and
passage means extending through the wall of said sleeve to communicate the recess in the latter with the recess in the inner member.

* * * * *